Aug. 26, 1958     A. P. WATERSON     2,849,206
HYDRAULIC TRACER CONTROL VALVE
Filed June 16, 1955     3 Sheets-Sheet 1

INVENTOR.
ARTHUR P. WATERSON.
BY
Willard S. Groen
ATTORNEY.

Aug. 26, 1958   A. P. WATERSON   2,849,206
HYDRAULIC TRACER CONTROL VALVE
Filed June 16, 1955   3 Sheets-Sheet 2

INVENTOR.
ARTHUR P. WATERSON.
BY
Willard S. Groen
ATTORNEY.

United States Patent Office 2,849,206  
Patented Aug. 26, 1958

2,849,206
HYDRAULIC TRACER CONTROL VALVE

Arthur P. Waterson, Fort Worth, Tex., assignor to R. K. Le Blond Machine Tool Co., Cincinnati, Ohio, a corporation of Delaware Application June 16, 1955, Serial No. 515,960

5 Claims. (Cl. 251—3)

This invention pertains to improvements in hydraulic tracer control valves and is related to improvements in tracer controlled tool units such as shown in Patents 2,474,134; 2,516,495; 2,587,542; 2,678,579; 2,691,913; and 2,697,373.

One of the objects of this invention is to provide an improved hydraulic tracer control valve of high sensitivity and with accuracy of control of the tool or workholding member relative to a template of predetermined configuration.

Another object of this invention is to provide a tracer control valve having a tracer finger which differentially controls a pair of reversing valve spools for precise control of the fluid pressure supplied to the fluid pressure cylinder of the tracing unit.

Still another object of this invention is to provide a tracer control valve with a pair of differentially actuated valve elements in which the elements are simultaneously biased by suitable yielding means during the operation of the valve.

Further features and advantages of this invention will appear from the detailed description of the drawings in which.

Figures 1, 3:
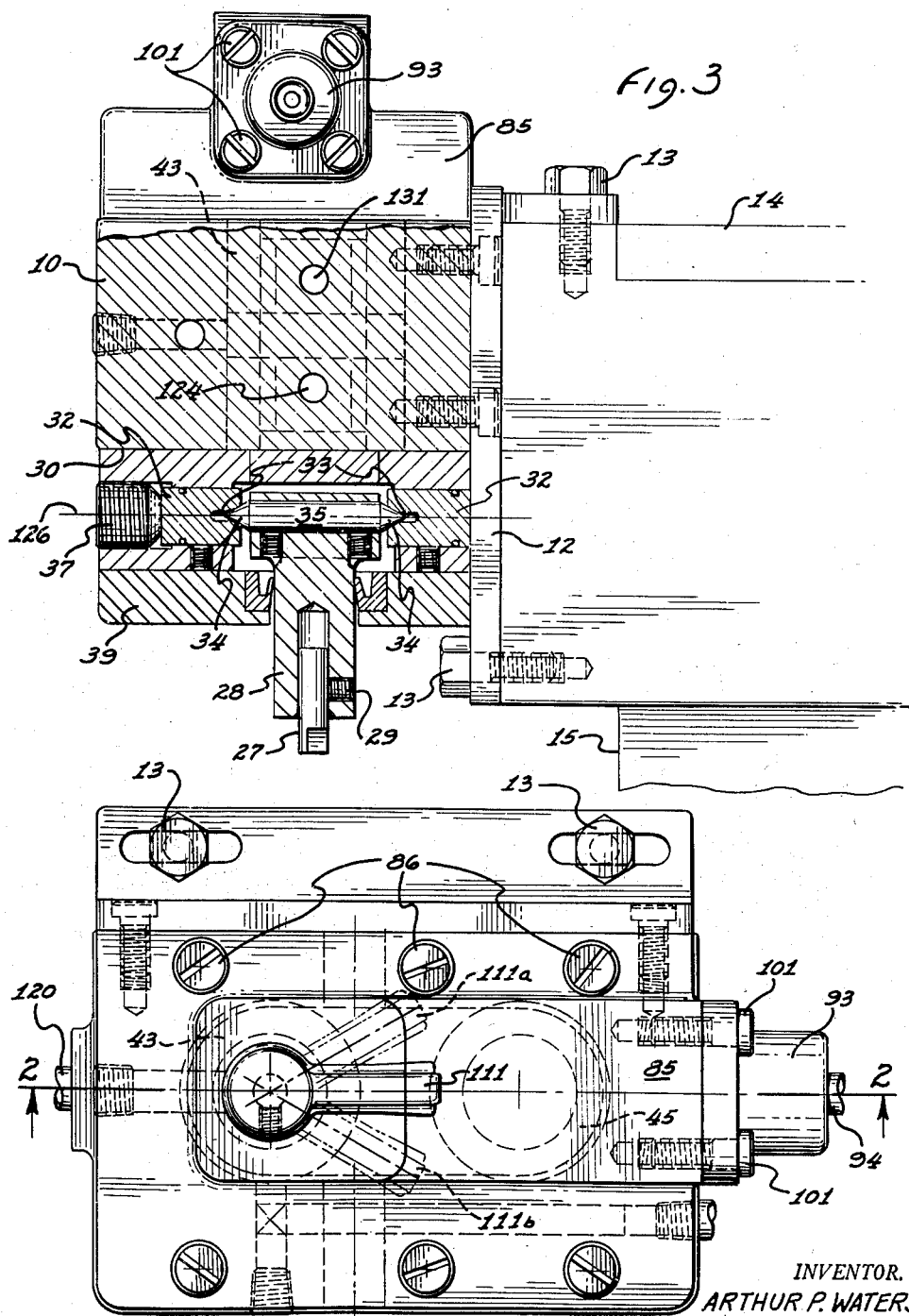
Fig. 1 is a plan view of the hydraulic tracer control valve incorporating the features of this invention.
Fig. 3 is a vertical section on the line 3—3 of Fig. 2.

As an example of one embodiment of this invention there is shown a hydraulic tracer control valve having a body 10 which is suitably fixed by screws 11 to a bracket 12 which in turn is fixed by suitable bolts 13 fixed to the reciprocatable member or tool slide 14, the tool slide 14 in turn being reciprocatably mounted on the rigid machine frame 15. A suitable actuating cylinder 16 is fixed to a suitable bracket 17 forming part of the bracket 12 described above. A reciprocatable piston 18 has a piston rod 19 reciprocatably mounted in the cylinder 16, the piston rod in turn being fixed at its outer end 20 to the rigid machine frame 15 so that when fluid pressure is applied in the pressure chambers 21 and 22 of the cylinder 16 the tool slide 14 and the valve body 10 may be relatively reciprocated on the machine frame. The control template 23 is also rigidly secured to the machine frame 15 by suitable screws 24, the control template having a control surface 25 engaged by the contact edge 26 of the tracer finger tip 27 fixed in the tracer finger 28 by suitable screw 29. Fixed to the bottom surface 30 of the valve body 10 is the tracer finger support block 31 in which are carried the trunnion plugs 32, Fig. 3, having conical center holes 33 in which are journaled the conical ends 34 of the rocker pin 35, the rocker pin 35 being rigidly secured in the rocker bar 36 forming an integral part of the tracer finger 28. A suitable adjusting screw 37 serves to maintain proper journaled relationship of the rocker pin 35 in the trunnion plugs 32. The lower portion of the cavity 38 is closed off by cover plate 39 by suitable screws 40, this cover plate 39 containing a flexible seal 41a engaging around the downwardly extending tracer finger 28 to form an oil-tight condition for the cavity 38.

In the body 10 are formed two bores 41 and 42, each bore containing a pair of axially spaced sleeves 43 and 44 in the bore 41 and the sleeves 45 and 46 in the bore 42. The sleeves 43 and 44 form between them a pressure passageway for annular groove 47 which is connected through the pressure line 48 to the pressure output line 49 of a fluid pressure pump 50, the pump in turn having a suction line 51 receiving a fluid supply 52 from the fluid reservoir 53, a suitable pressure relief valve 54 being provided for the pump to maintain a predetermined pressure supply in the line 49 and pressure supply annular groove 47.

Figure 2:
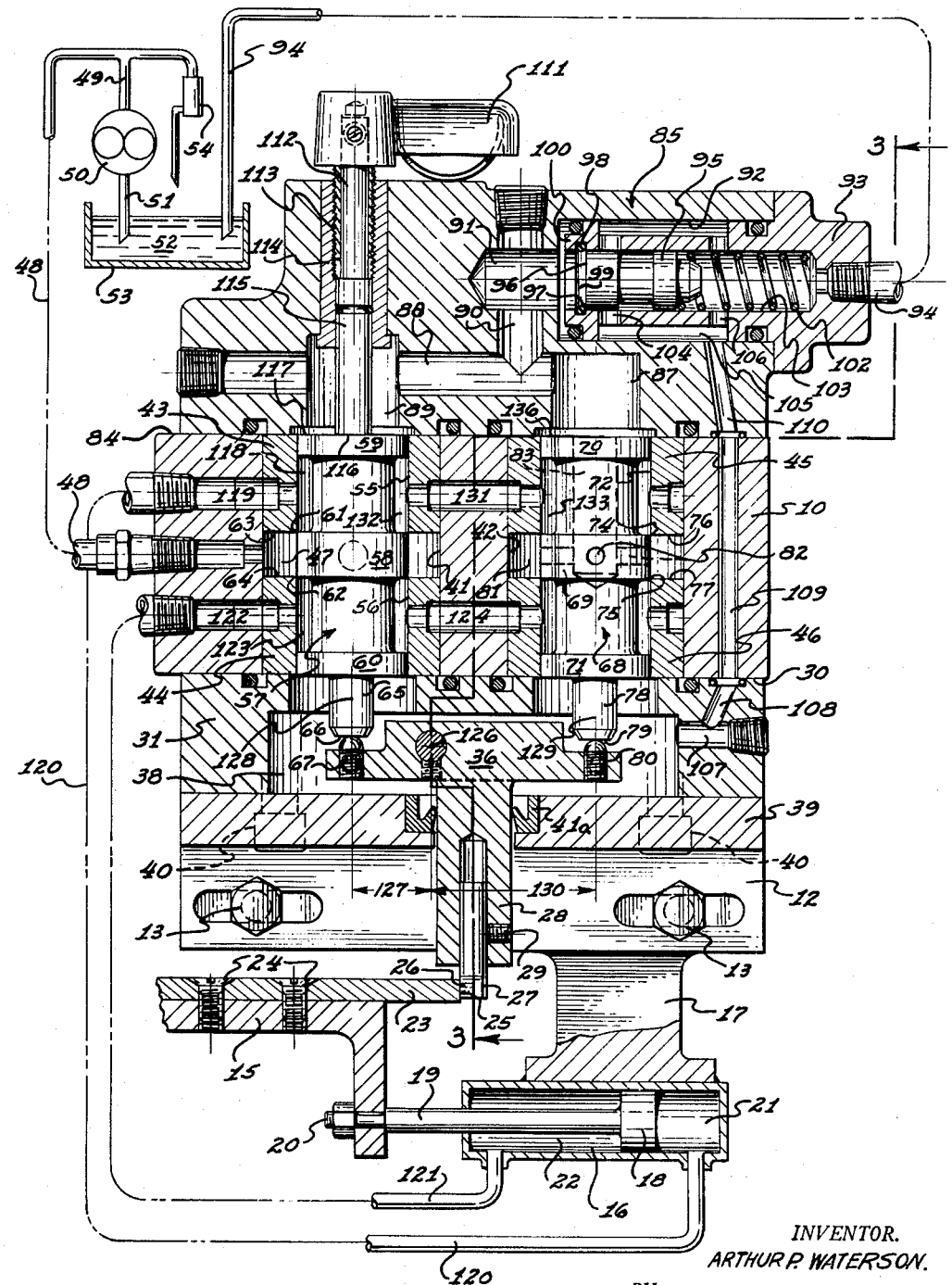
Fig. 2 is a vertical section on the line 2—2 of Fig. 1.
Figure 4:
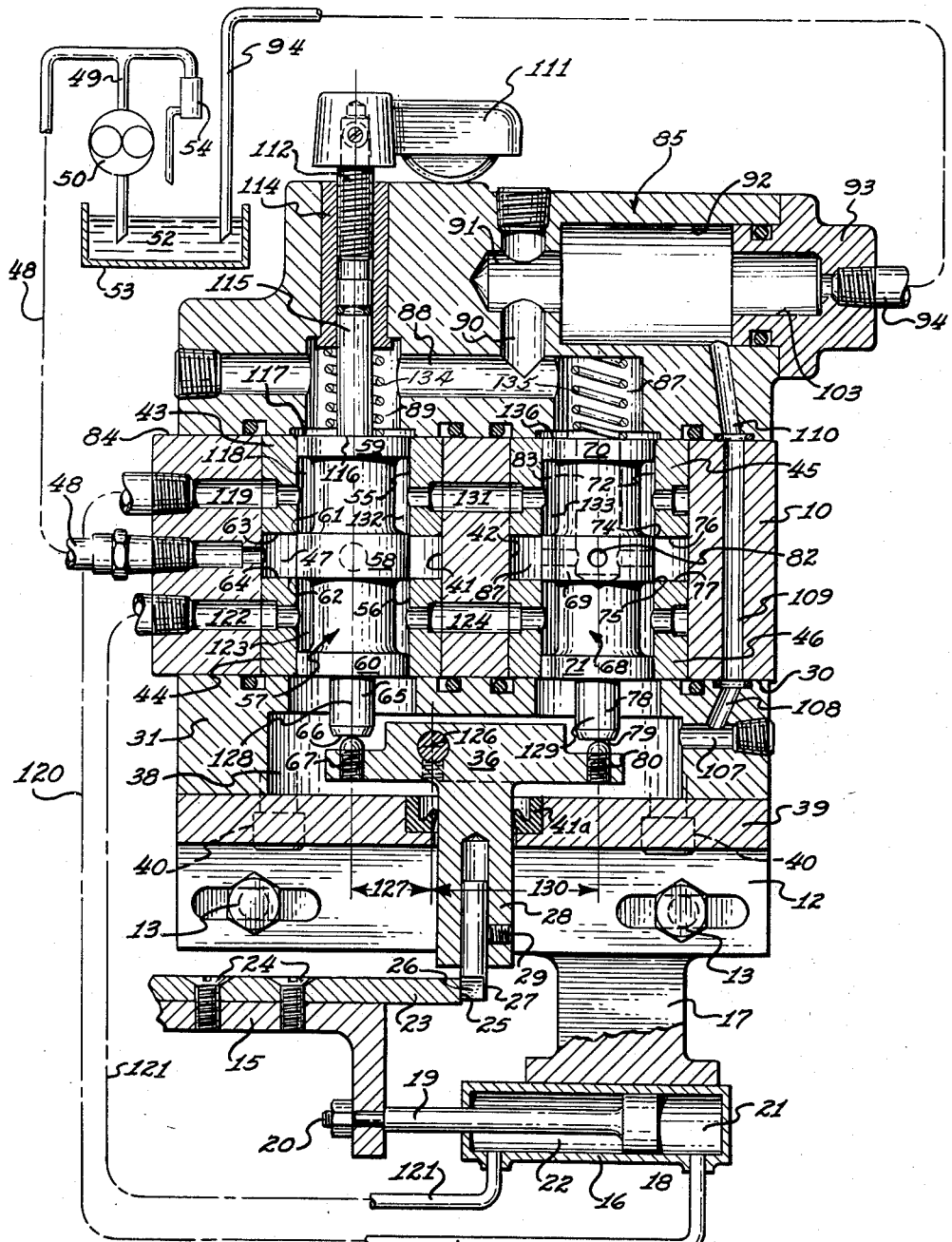
Fig. 4 is a vertical section similar to Fig. 2 illustrating a modification of the structure shown in Fig. 2.

Axially reciprocatable in the inner bores 55 and 56 of the respective sleeves 43 and 44 is the pressure control valve spool 57 having the wide annular ring 58 intermediate its ends and the narrower annular rings 59 and 60 at each end thereof nicely sliding in the bores 55 and 56 of the sleeves 43 and 44. The annular ring 58 forms with its edges 61 and 62 variable port openings with the edges of the respective faces 63 and 64 of the sleeves 43 and 44 as the valve spool 57 is reciprocated. A downwardly extending stem 65 has an end abutment surface 66 engaged by the abutment screw 67 fixed in one end of the rocker bar 36 so that rocking of the bar 36 by the template finger 28 affects reciprocation of the valve spool 57 in an upward direction as shown in Fig. 2.

In a similar manner the exhaust control spool 68 has the intermediate wide annular ring 69 and the end annular rings 70 and 71 of somewhat narrower width axially slidable in the bores 72 and 73 of the respective sleeves 45 and 46, the edges 74 and 75 forming with the faces 76 and 77 of the sleeves 45 and 46 a variable exhaust port controlling arrangement. The lower end of the valve spool 68 is provided with an integral downwardly extending stem 78 having an abutment surface 79 engaging the abutment screw 80 fixed in the other end of the rocker bar 36 from that of the screw 67 just described. In this arrangement reciprocation of the rocker bar 36 by the tracer finger 28 causes opposite reciprocation of the valve spools 57 and 68. The exhaust passageway 81 formed between the sleeves 45 and 46 communicates with the radial passageways 82 in the wide intermediate annular ring 69 of the exhaust control valve spool 68, the radial passageways 82 in turn communicating with the axial passageway 83 extending upwardly and out through the upper end of the exhaust control spool 68.

On top of the surface 84 is fixed the valve head casting 85 by suitable screws 86. This valve head 85 has a chamber 87 above the exhaust valve control spool 68 and receives discharge from the axial passageway 83 of that spool. A lateral passageway 88 communicates with a chamber 89 located in alignment over the pressure control valve spool 57. The lateral passageway 88 also communicates through a passageway 90 which in turn is in communication with a discharge outlet passageway 91 which opens into the enlarged bore 92 of the valve head casting 85. The passageway 92 is closed off by the drain line fitting 93 to which is connected the drain return line 94 for discharge of fluid back to the fluid reservoir 53.

A back pressure relief valve arrangement is provided between the discharge from the passageway 91 and the discharge line 94 and this apparatus comprises a plunger 95 having an inner face 96 terminating in an edge 97, which edge is normally urged in contact with a sealing ring 98 fixed in the annular groove 99 in the extended portion 100 formed integral with the drain line fitting 93 which in turn is secured by suitable screws 101 to the valve head casting 85. A compression spring 102 is carried in the bore 103 in the drain line fitting 93 and yieldingly engages the plunger 95 to normally urge it toward the O ring or seal ring 98. As pressure develops in the passageway 91 behind the plunger 95 it urges the plunger, to the right in Fig. 2, compressing the spring 102 and allowing fluid to pass by the seal ring 98 and the edge 97 of the end of the plunger 95. Fluid then escapes through the passageway 104 into the passageway 105 and out through the passageway 106 into the bore 103 containing the compression spring 102 from which it discharges into the drain line 94 for return to the reservoir 53. Thus, by regulating the characteristics of the spring 102 in urging the plunger 95 against the seal ring 98, a predetermined back pressure may be developed in the chambers 87 and 89 behind the valve plungers 68 and 57 respectively so as to normally urge these plungers downwardly against the respective abutment screws 80 and 67 carried in the rocker bar 36 of the tracer finger 28. A suitable drain line from the cavity 38 in the tracer finger support block is provided by the passageways 107, 108, 109 and 110, Fig. 2, for connecting any accumulated liquid in the chamber 38 and returning it to the passageway 105 where it may return through passageway 106 to the drain line 94 as described.

A manually operated tracer finger biasing device for moving the tracer to return position and holding it there comprises the selector lever 111 fixed on the rock shaft 112 which is threadedly journaled at 113 in a bushing 114 fixed in the valve head casting 85. It has an outwardly projecting stem 115 having an abutment surface on its lower end 116 which engages the top surface 117 of the pressure control valve spool 57. By moving the selector lever from position 111–a to position 111–b the stem 115 moves downwardly to bias or move the valve spool 57 downwardly to connect pressure from the line 48 past the edge 61 of the wide annular rim 58 of the valve spool 57 into the annular groove 118 of the spool 57 and then out through the passageway 119 to the cylinder supply line 120 which is connected to the pressure chamber 21 of the actuating cylinder 16. The other cylinder supply line 121 connected to the pressure chamber 22 of the cylinder 16 is connected through passageway 122 into the annular groove 123 formed in the spool 57. The annular groove 123 is connected through a passageway 124 to the annular groove formed in the valve spool 68. From the annular groove the fluid then discharges past the edges 75 of the wide intermediate annular ring 69 of the valve spool 68 into the exhaust passageway 81 and then out through the radial passageways 82 and the axial passageway 83 and finally into the drain line 94 as described. This causes the cylinder 16 to relatively move to the right, in Fig. 2, away from the machine frame piece 15 and thus withdraw the tracer finger 28 and its tip 27 from the template 23.

When the selector lever 111 is moved back to the normal tracing position 111–a, Fig. 1, the pressure control valve spool is then released from contact with the lower end 116 of the stem 115 and is free then to float under control of the tracer and back pressure in the chamber 89 as is the exhaust control spool 68. The tracer finger 28 and the valve spools 57 and 58 are normally biased to hold the tracer finger tip 27 against the abutment surface 25 of the template 23 by a unique arrangement of the pivotal mounting of the rocker bar 36. Referring particularly to Fig. 2 it will be noticed that the pivot axis 126 of rocking movement of the rocker pin 35 and the tracer finger 28 is more closely positioned as indicated by the dimension 127 to the axis 128 of the valve spool 57 than it is to the axis 129 of the valve spool 68 as indicated by the dimension 130. It thus follows that with equal pressure in the chambers 87 and 89 and equal diameters for the valve spools 57 and 68 that the greater force can be exerted by the valve spool 68 because of its greater leverage advantage 130 over the shorter and lesser leverage advantage 127 for the valve spool 57. As a result, with the application of back pressure in the chambers 87 and 89 due to the valve plunger 95 as described in the drain line the tracer finger will be normally swung to the left, Fig. 2, against the template 23. Thus, an automatic biasing of the template engaging finger of the tracer is obtained by the back pressure from the drain line from the exhaust from the valve spools 57 and 68.

In addition to the interconnecting passageway 124 there is also the interconnecting passageway 131 in the body 10 of the valve which interconnects the annular groove 132 of the valve spool 57 with the annular groove 133 of the valve spool 68. By this arrangement it is obvious that the reciprocating movement of the valve spools 57 and 68 in differentially opposite directions affects a reversal application of fluid pressure from the pump 50 to the respective chambers 21 and 22 of the cylinder 16 to thereby reciprocate and control the movement of the work or tool element upon which the valve structure described is mounted in a well known servo feed-back manner. It is important to note, however, that the travel of the pressure control valve spool 57 is smaller and of more precise and limited movement for control of the immediate discharge from the pump and cylinder whereas the exhaust control spool 68 travels a greater distance by the ratio indicated by 127—130 with regard to the pivot axis 126 of the tracer finger. This gives a smoothness and nicety of control which brings about high precision and smooth operation and precise following of the contour 25 of the template 23.

As a modification in utilizing the dual pressure applied simultaneously in the same direction to both the valve spools 57 and 68, referring to Fig. 2, the back pressure valve including the plunger 95 is eliminated so that passageway 91 is connected openly and freely to the discharge line 94. There is then inserted a pair of substantially equal compression springs 134 and 135 in the chambers 89 and 87 to respectively engage the top surfaces 117 and 136 of the tops of the respective valve spools 57 and 68. The same differential arrangement of leverage 127—130 applies so that again the tracer finger 28 and its tip 27 are biased against the contour surface 25 of the template 23 as described.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A hydraulic tracer control valve including a pressure control valve spool, an exhaust control valve spool, a tracer finger, a rocker bar fixed to said tracer finger having abutment means on the outer ends thereof operatively engaging said spools to axially reciprocate the same, yielding means engaging said spools to bias said spools in opposition to the movement effected by said rocker bar, and means for pivotally mounting said rocker bar and tracer finger on an axis of rocking movement located more closely to the axis of one of said spools than the other axis of the other so that actuation of said tracer finger oppositely reciprocates said spools with one spool traveling a lesser distance than the other.

2. A hydraulic tracer control valve including a pressure control valve spool, an exhaust control valve spool, a tracer finger, a rocker bar fixed to said tracer finger having abutment means on the outer ends thereof operatively engaging said spools to axially reciprocate the same, yielding means engaging said spools to bias said spools in opposition to the movement effected by said rocker bar, and means for pivotally mounting said rocker bar and tracer finger on an axis of rocking movement located more closely to the axis of said pressure control valve spool than to the axis of said exhaust control valve spool so that actuation of said tracer finger oppositely reciprocates both of said spools with said pressure control valve spool traveling a lesser distance than said exhaust control valve spool.

3. A hydraulic tracer control valve including a body, a pressure control valve spool axially reciprocatable in said body to reversibly control the application of fluid pressure to a device to be actuated, an exhaust control valve spool axially reciprocatable in said body to reversibly control the discharge of fluid from said device, a rocker bar pivotally mounted on said body on an axis at right angles to the axes of reciprocation of said spools and located more closely to the axis of said pressure control valve spool than the axis of reciprocation of said exhaust control valve spool, abutment means on the outer ends of said rocker bar engaging the ends of said spools, yielding means on the other ends of said spools opposing the movement of said spools by said rocker bar, and a tracer finger including a tracer finger tip fixed to said rocker bar.

4. A hydraulic tracer control valve including a body, a pressure control valve spool axially reciprocatable in said body to reversibly control the application of fluid pressure to a device to be actuated, an exhaust control valve spool axially reciprocatable in said body to reversibly control the discharge of fluid from said device, a rocker bar pivotally mounted on said body on an axis at right angles to the axes of reciprocation of said spools and located more closely to the axis of said pressure control valve spool than the axis of reciprocation of said exhaust control valve spool, abutment means on the outer ends of said rocker bar engaging the ends of said spools, yielding means on the other ends of said spools opposing the movement of said spools by said rocker bar comprising a pressure chamber behind said other ends of said spools arranged to receive discharge from said exhaust control valve spool, and a drain line connected to said pressure chamber including a fluid resistance to maintain a predetermined back pressure in said pressure chamber, and a tracer finger including a tracer finger tip fixed to said rocker bar.

5. A hydraulic tracer control valve including a body, a pressure control valve spool axially reciprocatable in said body to reversibly control the application of fluid pressure to a device to be reciprocatably actuated, an exhaust control valve spool axially reciprocatable in said body to reversibly control the discharge of fluid from said device, a rocker bar pivotally mounted on said body on an axis at right angles to the axes of reciprocation of said spools and located more closely to the axis of said pressure control valve spool than the axis of reciprocation of said exhaust control valve spool, abutment means on the outer ends of said rocker bar engaging the ends of said spool, yielding means on the other ends of said spools opposing the movement of said spools by said rocker bar comprising compression springs, one behind the other ends of said spools and engaging said body, and a tracer finger including a tracer finger tip fixed to said rocker bar.

References Cited in the file of this patent
UNITED STATES PATENTS

| | | |
|---|---|---|
| 1,914,457 | Parsons et al. | June 20, 1933 |
| 2,079,720 | Shaw | May 11, 1937 |
| 2,587,542 | Siekman | Feb. 26, 1952 |
| 2,603,117 | Turchan | July 15, 1952 |
| 2,691,913 | Waterson | Oct. 19, 1954 |